United States Patent [19]

O'Donnell

[11] Patent Number: 4,470,303
[45] Date of Patent: Sep. 11, 1984

[54] QUANTITATIVE VOLUME BACKSCATTER IMAGING

[75] Inventor: Matthew O'Donnell, Schenectady, N.Y.

[73] Assignee: General Electric Company, Schenectady, N.Y.

[21] Appl. No.: 419,679

[22] Filed: Sep. 20, 1982

[51] Int. Cl.³ ............................................. G01N 29/04
[52] U.S. Cl. .................................... 73/602; 73/633
[58] Field of Search ............... 73/602, 633, 618, 619; 128/660

[56] References Cited

U.S. PATENT DOCUMENTS 4,409,838  10/1983  Schomberg ........................... 73/602

OTHER PUBLICATIONS

M. O'Donnell, J. G. Miller, Jr. of Applied Physics, vol. 52, No. 2, pp. 1056–1065, Feb. 1981.
H. E. Melton, Jr., D. J. Skorton, "Rational Gain Compensation for Attenuation in Ultrasonic Cardiac Imaging", 1981 Ultrasonics Symposium Proceedings, 81CH1689-9, 607.

Primary Examiner—Anthony V. Ciarlante
Attorney, Agent, or Firm—Donald R. Campbell; James C. Davis, Jr.; Paul R. Webb, II

[57] ABSTRACT

A conventional ultrasonic B-scan image is converted into a volume backscatter image by accounting for four propagation effects: dispersion of transmitted energy, beam width and beam intensity variations, inhomogeneous attenuation of ultrasonic energy, and signals resulting from specular reflections at interfaces. These images are a two-dimensional map of backscatter efficiency, are independent of details of the measurement system, and are quantitative images of an intrinsic property of tissue and other materials.

12 Claims, 13 Drawing Figures

QUANTITATIVE VOLUME BACKSCATTER IMAGING

BACKGROUND OF THE INVENTION

This invention relates to ultrasonic imaging and more particularly to a method of obtaining volume backscatter images.

The measurement of intrinsic acoustic parameters of tissue, such as absorption coefficient, sound velocity, and scattering coefficient, holds great promise for ultrasonic imaging. Moreover, spatially localized measurements of an intrinsic tissue parameter may permit tissue characterization using ultrasound. The results presented in a number of studies published over the last few years indicate that the ultrasonic backscatter coefficient is a sensitive index of tissue pathologies. These studies have shown that quantitative measurements of the backscatter coefficient can be used to identify specific tissue types. This invention concerns a specific method of using backscatter measurements for quantitative imaging.

Conventional B-scans are crude approximations to a backscatter image. The B-scan is a map of the signal intensity returning to the transducer from every point in the image. The volume backscatter coefficient, however, is a measure of the backscatter efficiency per unit volume. Because many factors can affect the absolute signal intensity, the B-scan is not an image of the scattering efficiency. To obtain a backscatter image, all factors influencing the absolute signal intensity must be taken into account.

A number of problems need to be solved which are not present in controlled laboratory studies in order to get quantitative volume backscatter images in the clinic. The principal problems can be segregated into two classes: detector artifacts and progagation effects. Detector artifacts arise primarily because conventional B-scan systems use piezoelectric transducers as both the transmitter of the interrogating ultrasonic pulse and the receiver of the backscattered pulse. Due to the phase sensitive nature of piezoelectric transducers, the detection of waves propagating through inhomogeneous media can be compromised by phase cancellation effects; phase distortions resulting from propagation through inhomogeneous media can dramatically alter the character of B-scan images. It has been shown by the inventor that these distortions do not significantly change estimates of the volume backscatter coefficient over a volume of tissue.

SUMMARY OF THE INVENTION

The primary propagation effects encountered in clinical measurements are dispersion or acoustic beam softening due to loss of high frequency components with increasing range, beam width and beam intensity variations, inhomogeneous attenuation of ultrasonic energy which can result in artifacts if conventional time gain compensation (TGC) circuits are used, and specular reflections at interfaces which are extrinsic properties of the tissue. To convert a B-scan image into a volume backscatter image, these effects must be dealt with. The B-scan image data is corrected, pixel by pixel, to minimize dispersion effects by selection of an appropriate form of impulse response of the transducer and by using a correction curve. Beam width (sample volume) and beam intensity variations are taken into account by making measurements of backscattered energy in a water tank and correcting the backscattered energy as a function of range.

Problems arising from inhomogeneous attenuation are minimized using an adaptive time gain compensation. An amplitude histogram of the B-scan image is prepared, and upper and lower thresholds for the adaptive TGC are obtained from the histogram. High, average, and low TGC coefficients by which the B-scan data are corrected are assigned to pixel amplitudes above, between, and below these thresholds. Signals associated with specular reflectors are removed by a derivative test. The spatial derivative of the A-scan data is obtained and signals that produce derivatives greater than a threshold value are replaced by the average data in its neighborhood. The value of the derivative threshold can also be gotten from the B-scan statistics. If the difference between the signals of two neighboring pixels differs by more than the standard deviation, then the signal results from a specular reflector.

The corrected B-scan data is indicative of or relates to the volume backscatter coefficient, a measure of backscatter efficiency per unit volume. The volume backscatter image represents a two-dimensional map of the backscatter efficiency in the plane of the B-scan, and consequently is independent of the details of the measurement system. These images are quantitative images of an intrinsic property of the tissue, and have better contrast resolution than the B-scan image.

BRIEF DESCRIPTION OF THE DRAWINGS

FIG. 7 is an amplitude histogram of the B-scan image presented in FIG. 6a.

DETAILED DESCRIPTION OF THE INVENTION

A more thorough discussion of the volume backscatter coefficient and backscatter efficiency, and their measurement, is given in "Quantitative Broadband Ultrasonic Backscatter: An Approach to Nondestructive Evaluation in Acoustically Inhomogeneous Materials", M. O'Donnell and J. G. Miller, Jr. of Applied Physics, Vol. 52, No. 2, February 1981, pp. 1056–1065, the disclosure of which is incorporated herein by reference. Methods for obtaining quantitative measurements of the volume backscatter coefficient in man in the clinical environment using conventional B-scan equipment are now described. These measurements can be used to generate a quantitative volume backscatter image using the same scan format as a B-scan. Before quantitative images of the volume backscatter coefficient can be obtained in man, the problems associated with propagation effects, i.e., phenomenon that can alter the efficiency estimation from a volume of tissue, must be minimized. The primary propagation effects to be addressed are: inhomogeneous attenuation, specular reflections at interfaces, tissue dispersion, and variations in the beam width and beam intensity throughout the image plane.

Figure 1:
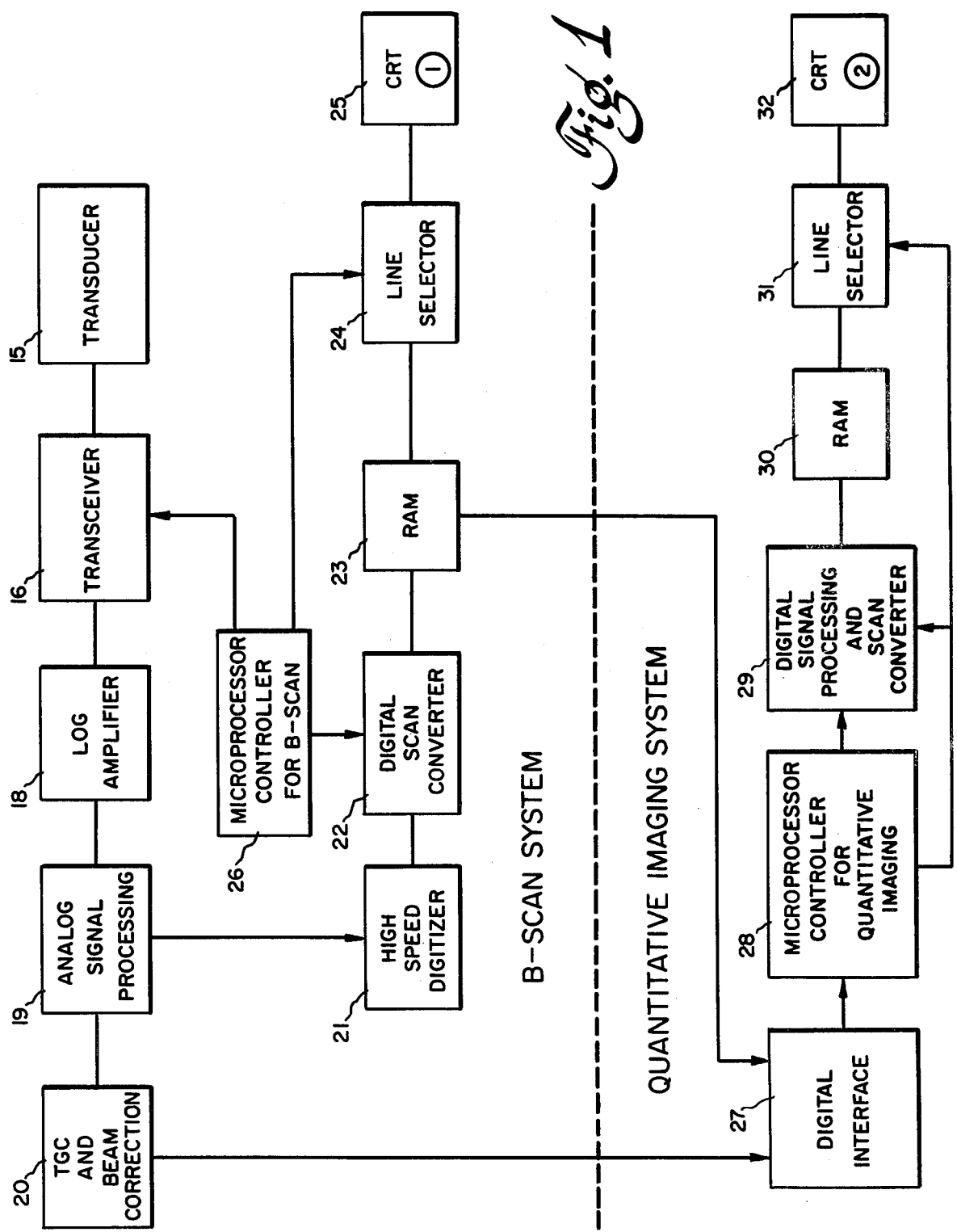
FIG. 1 is a block diagram of a B-scan ultrasound system and the additional hardware to produce a quantitative volume backscatter image.
Figure 2:
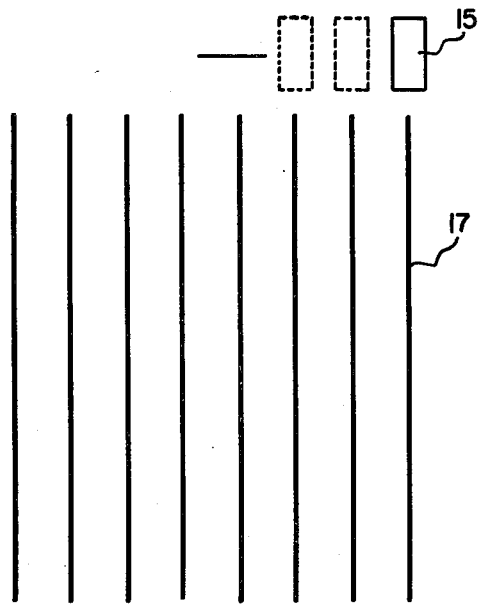
FIG. 2 is a sketch of a transducer making a scan.

The system hardware to get both a two dimensional B-scan image, which has the best spatial resolution, and a quantitative volume backscatter image, which has the best contrast resolution, is shown in block diagram form in FIG. 1. One B-scan system is illustrated above the dashed line, but it is understood that the invention can be used with any B-scan system. The transducer 15 is, for instance, a broadband circular transducer with a 2 MHz nominal center frequency that is mechanically focused. Transceiver 16 produces impluses that excite the transducer to generate the incident ultrasonic pulse and produce a beam of ultrasound, and the reflected signal is detected by the same transducer and converted to a received signal that is filtered and amplified. The transducer is mechanically moved as depicted in FIG. 2 to scan the object; each of the scan lines 17 is an A-scan line. The received signal is compressed in a logarithmic amplifier 18 and presented to analog signal processing circuitry 19. Here the rf signal is envelope-detected, low pass filtered, etc., to convert it to a video signal, a time gain compensation correction is made for signal loss resulting from exponential attenuation of ultrasonic energy with increasing range, and a beam correction to compensate for amplitude variations away from the focal point (but not for beam width changes) is made. Information on the latter is stored in a memory 20. The processed signal is sent to a high speed digitizer 21 and entered into the proper location in a digital scan converter 22. This is not a real time system; the contents of the digital scan converter are transferred to a random access memory 23. This contains a complete frame of B-scan data; every column in the matrix is a line of A-scan data. The line selector 24 converts the image data to a raster scan and the B-scan image, a map of the intensity of detected ultrasonic energy, is displayed by the cathode ray tube device 25. The system controller 26 is typically a microprocessor that has been suitably programmed.

The added hardware needed to convert the B-scan image into a quantitative volume backscatter image is shown below the dashed line in FIG. 1. The B-scan image data stored in RAM 23, and TGC and beam correction information from memory 20, are read out to the digital interface 27. It is preferred to have the microprocessor controller 28 deal with the raw data, i.e., the rf signal output of the transducer before any signal processing. Thus, the TGC and beam corrections that were made and the analog signal processing are taken into account, pixel by pixel, before correcting the B-scan data to get the quantitative volume backscatter image. The other components are the digital signal processing and scan converter circuitry 29, and a second RAM 30, line selector 31, and cathode ray tube 32 on which the gray scale volume backscatter image is displayed.

To test methods for minimizing progation effects in tissue, phantoms were designed and constructed to mimic the acoustic properties of several soft tissue types found in the human heart. Water-based gelatins containing suspensions of solid particles were used in the phantoms. The attenuation coefficient and backscatter coefficient were controlled primarily by the size and concentration of three types of solid particles, silica, graphite, and alumina. The large diameter alumina particles were used in small concentrations to manipulate the backscatter coefficient without dramatically altering the attenuation coefficient. The general tissue types whose acoustic properties were approximated in the phantom were fat, blood, muscle, and scar tissue. The backscatter coefficient ($cm^{-1}-\Omega^{-1}$) of these at 2 MH were: none, small, $5.1\times10^{-4}$, and $4.0\times10^{-2}$.

Figure 3:
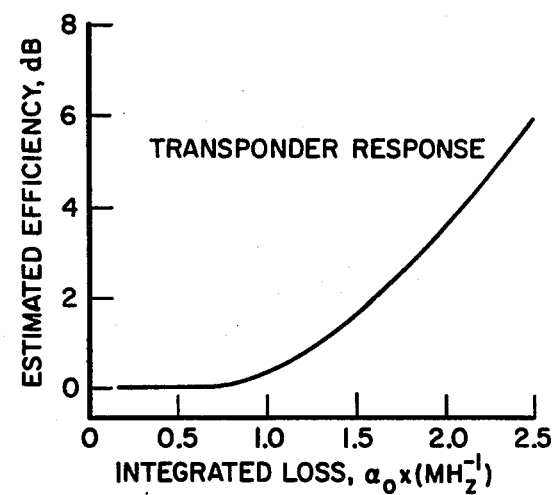
FIG. 3 shows estimated scattering efficiency as a function of integrated loss for the actual transducer response.

The volume backscatter coefficient is a measure of scattering efficiency. To obtain a quantitative volume backscatter image, the measured ultrasound intensity must be normalized to the incident intensity at every point in the image plane, and any alterations in the backscattered intensity due to propagation from the image point to the transducer are accounted for. The first propagation effect that is taken into account is dispersion or beam softening, the loss of high frequency components with increasing range. Dispersion effects are minimized by choosing the transducer properly, including selection of an appropriate form for the impulse response of the transducer. The center frequency of the transducer is chosen carefully, balancing resolution and range, and the bandwidth is at most 50 percent and is above 33 percent. The transducer should have smoothly varying characteristics. It is then calibrated. Dispersion errors can be reduced for the transducer mentioned above if the backscattered energy is altered and corrected by the curve shown in FIG. 3. Estimated scattering efficiency is given as a function of integrated loss ($\alpha_0 x$, where $\alpha_0$ is the slope of the attenuation coefficient as a function of frequency and $x$ is depth) for the actual transducer response. This correction curve is stored in microprocessor 28, and the B-scan data is corrected by normalizing to this curve.

Figure 4:
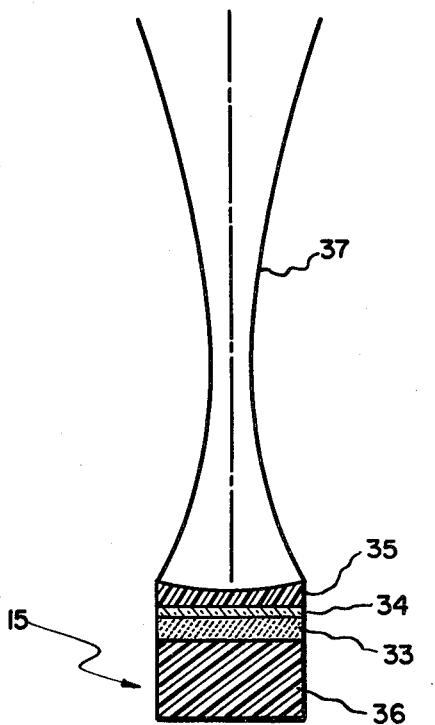
FIG. 4 is a cross section of a circular transducer and depicts its beam pattern.
Figure 5:
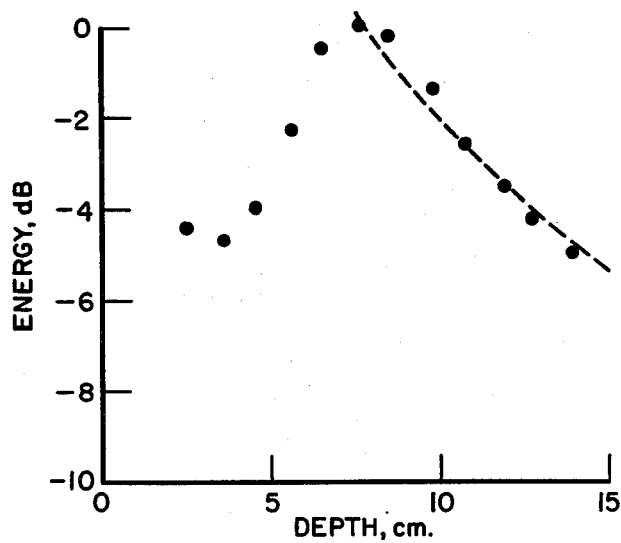
FIG. 5 is a graph showing the range dependence of the backscattered energy from a volume of scatterers.

The second propagation effect taken care of is acoustic beam width variations and beam intensity variations. Referring to FIG. 4, transducer 15 has a piezoelectric ceramic layer 33, a quarter-wave matching layer 34, a lens 35, and a plastic backing 36. The transducer is focused at 8.5 cm at which point the beam is narrowest and the intensity of ultrasonic energy is highest. Any real transducer has range dependent amplitude variations and the cross section of the beam changes with depth. Beam width (sample volume) and beam intensity variations are taken into account by normalizing all measurements to standards obtained in a water tank. Water is a relatively clear environment for ultrasound as contrasted to that in the human body. A correction curve, such as that shown in FIG. 5, accounts for the range dependence of the backscattered energy from a volume of scatterers. This curve is generated and stored in microprocessor 28, and corrects for both beam width and beam intensity variations. The dashed line illustrates the quadratic fall off of energy with increasing distance beyond the focal point, and in the near field there is reduced response. The B-scan image data is altered and corrected, pixel by pixel, by normalizing to this curve.

The third propagation effect accounted for is inhomogeneous attenuation; problems arising from this are minimized using an adaptive TGC. Time gain compensation circuits are used in conventional B-scan imaging systems to correct for signal loss resulting from exponential attenuation. However, due to the inhomogeneity of the attenuation coefficient within the body, conventional TGC approaches can result in significant artifacts. To demonstrate this problem, a B-scan of one of the tissue phantoms was obtained. The image presented in FIG. 6a was generated using a conventional TGC approach. The transducer was above the phantom and the scan lines are vertical. The bright areas in the upper central portion and lower right portion of this image correspond to regions of high scattering where there is material mimicking scar tissue. In contrast, the bright regions in the lower left, and extreme left and right edges, of the image do not correspond to regions of high scattering. These image artifacts result because the TGC corrects all beams within the image equally. As a result, if a beam propagates through a relatively low loss region, such as a large fat area or a fluid-filled cavity, then the TGC overcompensates for propagation losses. Similarly, the TGC undercompensates for propagation through a highly attenuating region. In the image presented in FIG. 6a, the TGC overcompensated for propagation through a long path in a low loss region, the dark area at the left of the image. Thus, the B-scan overestimates the scattering from the region beyond this low loss region producing the bright area at the lower left which is an artifact.

Figure 6A:
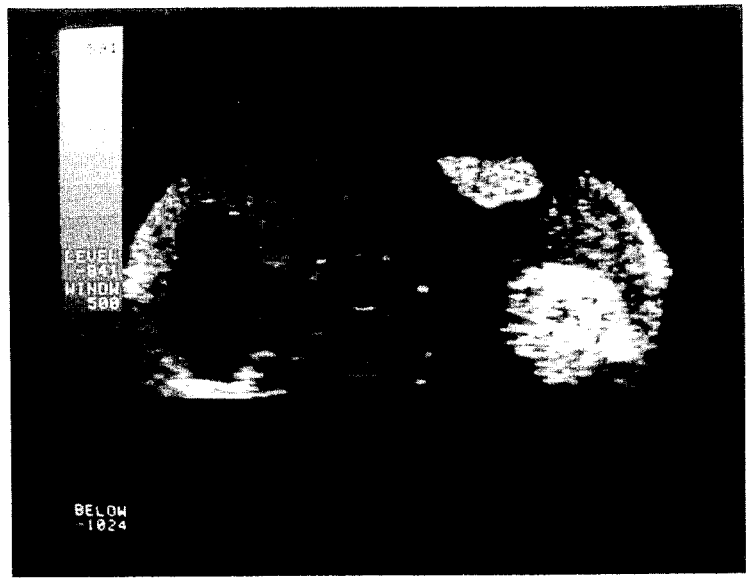
FIGS. 6a and 6b are B-scan images of a tissue phantom using conventional TGC and adaptive TGC.
Figure 7:
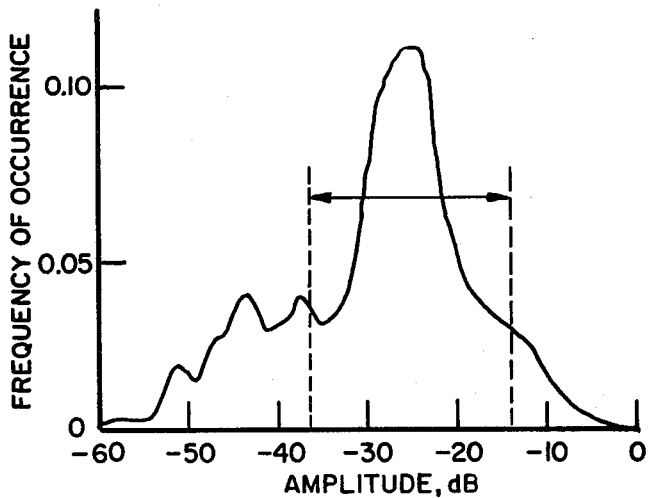

The approach to adaptive TGC is to use the statistics of the B-scan image itself to determine threshold levels for regions of both high attenuation and low attenuation. FIG. 7 represents an amplitude histogram of the B-scan image in FIG. 6a. The ordinate gives the frequency of occurrence of the pixel amplitudes, presented along the abscissa, where 0 dB represents the highest amplitude within the B-scan. The peak at about $-25$ dB identifies the average backscatter in the image. Consequently, the upper and lower thresholds for the adaptive TGC can be obtained from this histogram. The segment illustrated by the dashed lines represents two times the width of the central peak at half maximum (twice the standard deviation). A pixel amplitude which does not fall within this interval is considered to represent a region of attenuation different from the average. A pixel amplitude below the interval is identified as a region of low attenuation, whereas a pixel amplitude above the interval is identified as a region of high attenuation. The B-scan statistics, histograms, standard deviation, and threshold values are calculated in microprocessor 28; given the information in this specification the programmer who has ordinary skill in the art will understand how to proceed.

Figure 6B:
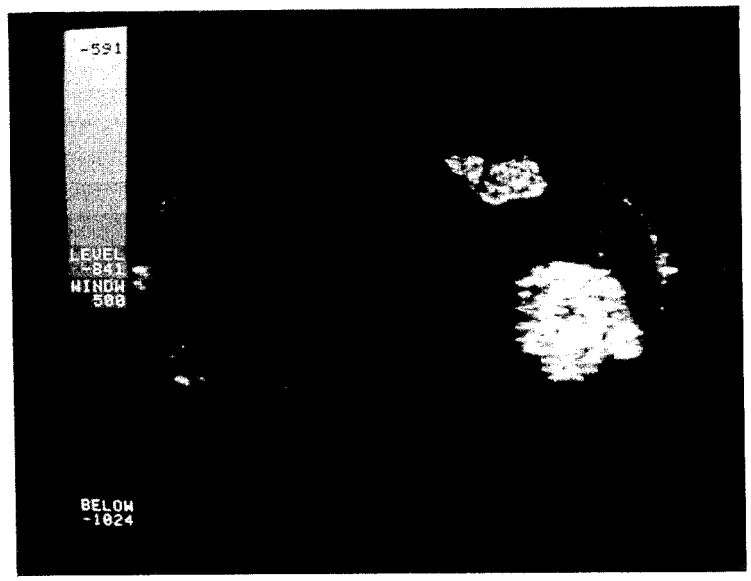

Based on a comparison of the B-scan amplitude within each pixel to the upper and lower threshold levels, beam-dependent TGC curves are generated. Each pixel that exhibits an amplitude higher than the upper threshold is assigned a large TGC coefficient corresponding to the average attenuation in high scattering regions. Similarly, all pixels exhibiting an amplitude less than the lower threshold are assigned a small TGC coefficient corresponding to the average attenuation in low scattering regions. All pixels that lie within the average range of amplitudes, twice the standard deviation, are assigned a TGC coefficient corresponding to the average attenuation of the tissue being imaged. More than three coefficients is not advantageous because there are other sources of error. Using these new coefficients, the attenuation at each pixel within the B-scan image is computed, and new B-scan data is generated. That is, in signal processing circuitry 29 the original B-scan data is multiplied by the new coefficient to correct for signal loss by propagation through attenuating material. This process can be repeated in an iterative fashion until the standard deviation of the amplitude within the image does not change significantly. In FIG. 6b is presented the B-scan image generated after two iterations. The bright artifact in the lower left of the original image, FIG. 6a, is greatly reduced. This adaptive TGC method, although not representing an exact correction to the problem of inhomogeneous attenuation, is capable of substantially reducing artifacts associated with inhomogeneous attenuation.

Figure 8:
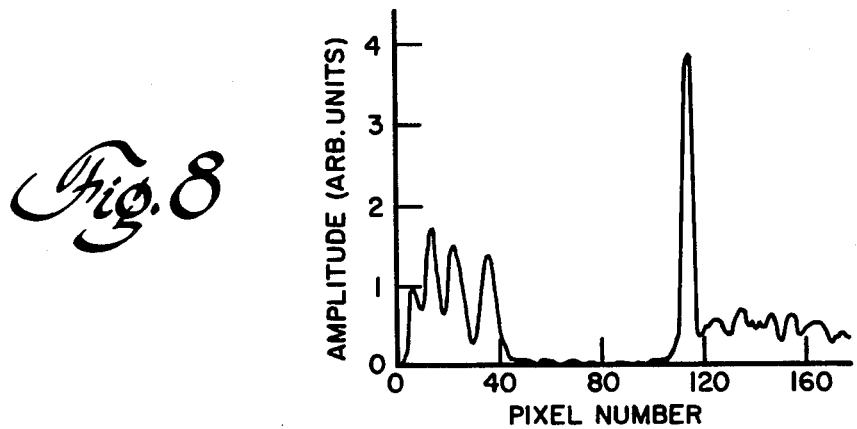
FIG. 8 shows a single A-scan line from a B-scan of a tissue phantom.

The fourth propagation effect accounted for is specular reflections at interfaces. Conventional ultrasonic B-scans use signals produced by both volume backscatter and specular reflections at tissue boundaries to generate an image. To obtain volume backscatter images, signals associated with specular reflections must be eliminated. This is done using a derivative test. The problem is illustrated in FIG. 8, which represents a single A-scan line from a B-scan of one of the tissue phantoms. The large peak in the A-scan near pixel 115 corresponds to a specular reflection between two different regions of the phantom. In contrast, the peaks near pixels 10–40 result from high volume backscatter within this region of the phantom. In order to recover unambiguously the volume backscatter, a large signal associated with a specular reflection must be distinguished from large scattering signals.

Figure 9:
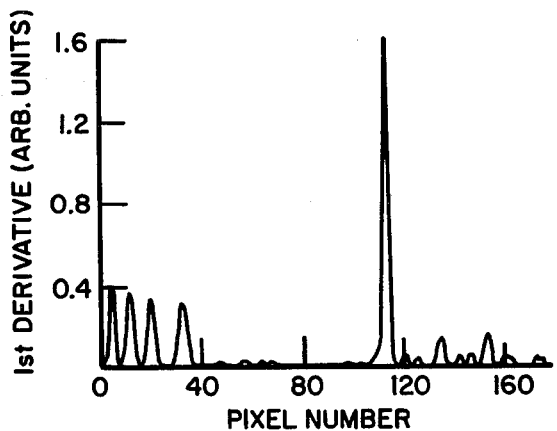
FIG. 9 depicts the derivative of the A-scan in FIG. 8.

Because they occur only at interfaces, large signals associated with specular reflectors must result in a large positive spatial derivative of the A-scan. However, the magnitude of the spatial derivative of the A-scan is generally smaller in high scattering regions as compared to specular reflectors. These features of a specular reflector are illustrated in FIG. 9, where the first spatial derivative of the A-scan of FIG. 8 is presented as a function of depth. The specular reflector is clearly identified in this figure, by a large positive value of the spatial derivative of the A-scan. To eliminate these signals, a threshold value for the spatial derivative must be obtained. All signals which produce spatial derivatives less than the threshold are retained, whereas signals producing spatial derivatives greater than the threshold are removed and are replaced by the average value of the A-scan in the neighborhood of the signal. A reasonable choice for the value of the derivative threshold can be obtained from the statistics of the B-scan itself. The standard deviation of the amplitude in the B-scan, the half width of the central peak in FIG. 7 at half amplitude, is a measure of the average fluctuations in the image. If the difference between the signal amplitude of any neighboring pixels within an image differs by a value greater than the standard deviation, then the signal probably results from a specular reflector. That is, the finite difference between neighboring pixels, a quantity directly related to the sampled approximation of the first derivative, must produce a positive value greater than the standard deviation in order to be identified with a specular reflector. The standard deviation of amplitude is calculated in microprocesser 28 and the other tasks are performed by the digital signal processing circuitry 29.

Figure 10:
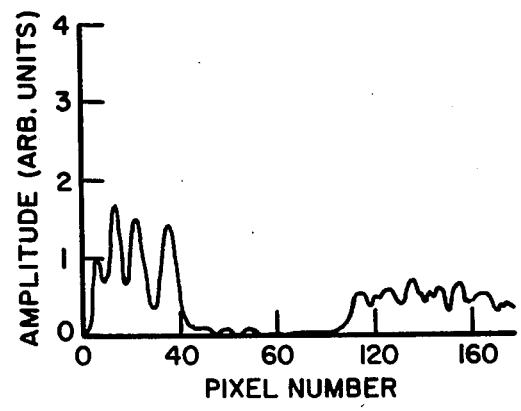
FIG. 10 shows the single A-scan line of FIG. 8 where the specular reflector has been removed by the derivative test.

The result of using this method is illustrated in FIG. 10. This figure represents the same A-scan line as in FIG. 8, where the specular reflector has been identified by the derivative test, and the signal associated with it has been removed and replaced by the average value of the A-scan in the neighborhood of the signal. A conventional seven-point smoothing algorithm was used to replace the peak associated with the specular reflector. Although the derivative method is not capable of identifying all signals resulting from specular reflectors, it is capable of identifying very large signals which may produce significant artifacts in volume backscatter images.

Figure 11A:
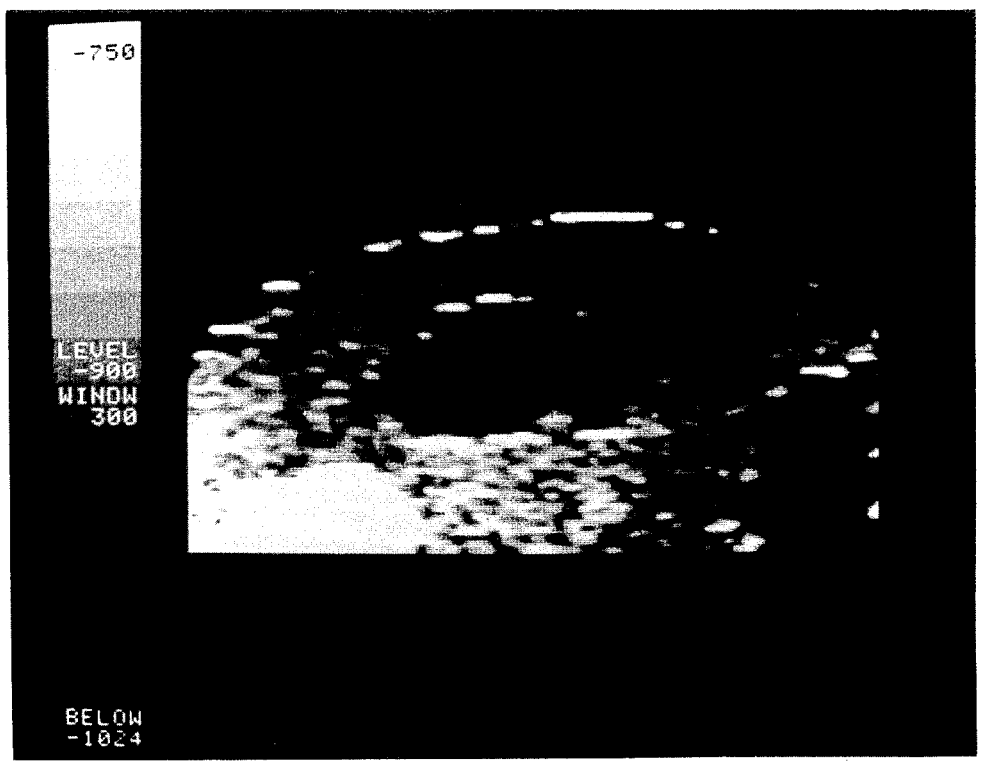
FIGS. 11a and 11b are a B-scan image and a quantitative volume backscatter image of a tissue phantom.
Figure 11B:
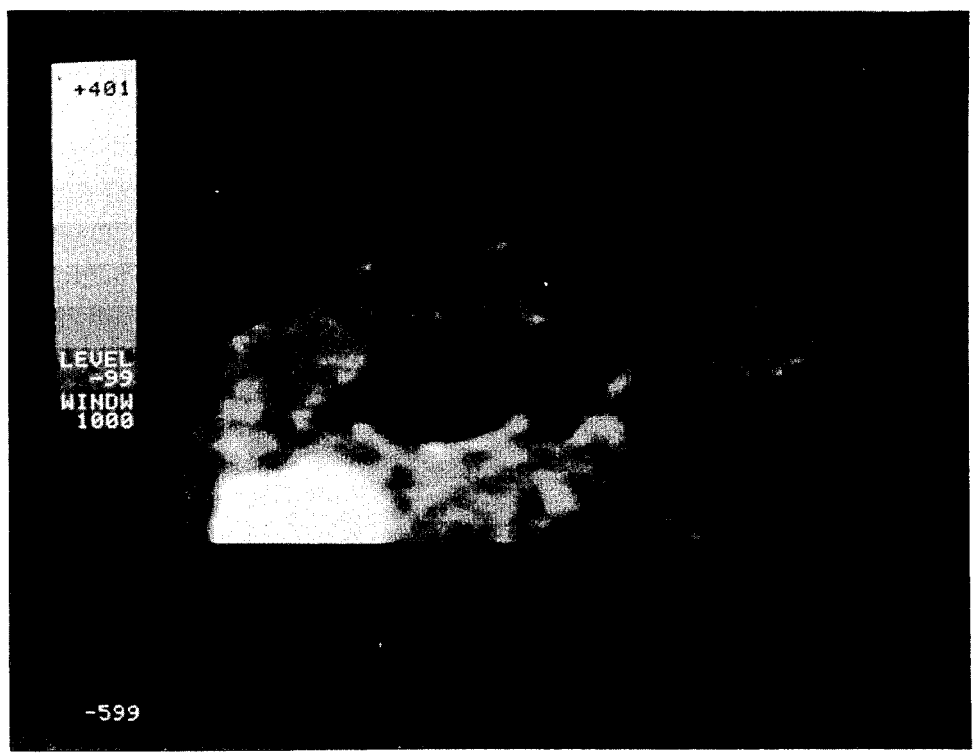

The methods given for minimization of errors associated with propagation effects have been applied to B-scan images of tissue phantoms. In FIG. 11a the B-scan image of one of the phantoms is presented. There is one high scattering region in the lower left corner of this image. All other bright regions represent artifacts associated with either specular reflectors or inhomogeneous attenuation. In FIG. 11b, the quantitative volume backscatter image corresponding to this B-scan is presented. As is evident from this figure, artifacts associated with specular reflectors and inhomogeneous attenuation are greatly reduced.

Unlike a conventional B-scan image, the gray scale in FIG. 11b has a quantitative meaning. The image data ranges from $-1000$ units to $+1000$ units, where for this transducer $-1000$ corresponds to a volume backscatter efficiency of $-80$ dB and $+1000$ corresponds to a volume backscatter efficiency of $-30$ dB. Thus, the gray scale is a purely logarithmic scale where the lower limit represents a backscatter coefficient of about $9 \times 10^{-6}$ (cm$^{-1} - \Omega^{-1}$) at 2.0 MHz, and the upper limit represents a backscatter coefficient of about $9 \times 10^{-1}$ (cm$^{-1} - \Omega^{-1}$) at 2.0 MHz. The gray areas in this image are regions mimicking muscle and have a brightness about $-300$ units, the white areas are regions mimicking scar tissue and have brightness of about $+400$ units, and the black areas are regions representing blood.

These results demonstrate that quantitative volume backscatter images can be obtained from conventional B-scan images. These images represent a two-dimensional map of the backscatter efficiency in the plane of the B-scan, and consequently are independent of details of the measurement system. Because of this, volume backscatter images are quantitative images of an intrinsic property of the tissue.

Further information is given in the inventor's publication "Quantitative Volume Backscatter Imaging", Report No. 82CRD136, May 1982, General Electric Company, Corporate Research and Development, Schenectady, N.Y. 12345. (IEEE Trans. Sonics and Ultrasonics, SU-30, pp. 26-36, January 1983 is the same in substance.)

While the invention has been particularly shown and described with reference to preferred embodiments thereof, it will be understood that changes in form and details may be made therein without departing from the spirit and scope of the invention.

The invention claimed is:

1. A method of producing quantitative volume backscatter images from two dimensional B-scan ultrasonic images comprising the steps of:

transmitting acoustic pulses along many scan lines and producing beams of ultrasound to scan an object, receiving ultrasonic energy and generating received signals that are processed to provide B-scan image data which is displayed;

correcting said B-scan image data to account for propagation effects that can alter backscatter intensity due to propagation from an image point to a transducer, and produce corrected data indicative of the volume backscatter coefficient; and displaying said corrected data as a gray scale volume backscatter image.

2. The method of claim 1 wherein one propagation effect is inhomogeneous attenuation of ultrasonic energy which is accounted for by determining the high, average, and low pixel amplitude intervals of said B-scan image data and assigning high, average, and low time gain compensation (TGC) coefficients by which said B-scan data is corrected to account for signal loss by propagation through attenuating material.

3. A method of producing quantitative volume backscatter images from two dimensional B-scan ultrasonic images comprising the steps of:

transmitting acoustic pulses along many scan lines and producing beams of ultrasound to scan an object, receiving ultrasonic energy and generating received signals that are processed to provide B-scan image data which is displayed;

correcting said B-scan image data to account for certain propagation effects and produce corrected data indicative of the volume backscatter coefficient;

wherein said propagation effects accounted for are dispersion of ultrasonic energy, beam width and beam intensity variations, inhomogeneous attenuation of ultrasonic energy, and specular reflections at interfaces; and displaying said corrected data as a gray scale volume backscatter image.

4. A method of producing quantitative volume backscatter images from two dimensional B-scan ultrasonic images comprising the steps of:

transmitting acoustic pulses along many scan lines and producing beams of ultrasound to scan an object, receiving ultrasonic energy and generating received signals that are processed to provide B-scan image data which is displayed:

correcting said B-scan image data to account for certain propagation effects and produce corrected data indicative of the volume backscatter coefficient;

wherein one propagation effect is specular reflection from interfaces which is accounted for by obtaining the spatial derivative of every line of data and replacing signals that produce derivatives greater than a predetermined threshold by the average data in the neighborhood of said signals; and displaying said corrected data as a gray scale volume backscatter image.

5. A method of producing quantitative volume backscatter images from two dimensional B-scan ultrasonic images comprising the steps of:

transmitting acoustic pulses along many scan lines and producing beams of ultrasound to scan an object, receiving ultrasonic energy and generating received signals that are processed to provide B-scan image data which is displayed on a cathode ray tube device;

correcting said B-scan image data, pixel by pixel, for dispersion of ultrasonic energy, for beam width and beam intensity variations, for inhomogeneous attenuation of ultrasonic energy by using adaptive time gain compensation, and for signals resulting from specular reflections at interfaces using a derivative test; and displaying said corrected data as a quantitative volume backscatter image respresenting backscatter efficiency in the plane of the B-scan.

6. The method of claim 5 wherein correcting for dispersion of ultrasonic energy is realized using a known correction curve for the transducer that transmits and receives ultrasonic energy, and altering the signal energy accordingly.

7. The method of claim 5 wherein correcting for beam width and beam intensity variations is realized by making measurements of backscattered energy in a water tank and generating a correction curve for the transducer that transmits and receives ultrasonic energy, and altering the signal energy accordingly, depending on range.

8. The method of claim 5 wherein correcting for inhomogeneous attenuation of ultrasonic energy is realized by deriving high, average, and low time gain compensation coefficients from an amplitude histogram of said B-scan image data by which said data is altered to account for signal loss by propagation through attenuating material.

9. The method of claim 8 wherein twice the standard deviation of the amplitude of said B-scan image data is determined and sets upper and lower thresholds, and assigning said high, average, and low time gain compensation coefficients to pixel amplitudes above said upper threshold, between said thresholds, and below said lower threshold.

10. The method of claim 5 wherein correcting for specular reflections is implemented by obtaining the spatial derivative of a line of image data and replacing signals that produce derivatives greater than a predetermined threshold by the average data in the neighborhood of said signals.

11. The method of claim 5 wherein correcting for specular reflections is implemented by preparing an amplitude histogram of said B-scan image data, determining the standard deviation of the amplitude and when the difference in amplitude between a pixel and its neighbor is greater than the standard deviation and results from a specular reflector, and replacing any such pixel by the average amplitude of neighboring pixels.

12. The method of claim 5 wherein, before correcting said B-scan image data, any processing of said received signal to make corrections and produce a video output is undone.

* * * * *